US011360538B2

(12) United States Patent
Liu

(10) Patent No.: US 11,360,538 B2
(45) Date of Patent: *Jun. 14, 2022

(54) MECHANISM FOR AUTOMATICALLY POWERING OFF/ON A VISUAL DISPLAY

(71) Applicant: World Richman Manufacturing Corporation, Elgin, IL (US)

(72) Inventor: Michael Liu, FoShan (CN)

(73) Assignee: World Richman Manufacturing Corporation, Elgin, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/520,105

(22) Filed: Nov. 5, 2021

(65) Prior Publication Data

US 2022/0057853 A1 Feb. 24, 2022

Related U.S. Application Data

(63) Continuation-in-part of application No. 16/844,444, filed on Apr. 9, 2020, now Pat. No. 11,201,636.

(60) Provisional application No. 63/110,933, filed on Nov. 6, 2020.

(51) Int. Cl.
*G06F 1/3231* (2019.01)
*F16M 13/00* (2006.01)
*G06F 1/3234* (2019.01)

(52) U.S. Cl.
CPC ......... *G06F 1/3231* (2013.01); *F16M 13/005* (2013.01); *G06F 1/3265* (2013.01)

(58) Field of Classification Search
CPC ...... H04B 1/3888; H04M 1/21; H04M 1/026; H04M 1/04
See application file for complete search history.

(56) References Cited

U.S. PATENT DOCUMENTS

| 666,223 | A | * | 1/1901 | Shedlock | F25B 17/00 |
| | | | | | 62/481 |
| 8,655,422 | B2 | * | 2/2014 | Stiehl | A45F 5/00 |
| | | | | | 455/575.8 |
| 9,048,665 | B2 | * | 6/2015 | Wojcik | H02J 4/00 |
| 9,392,854 | B2 | * | 7/2016 | Fathollahi | H05K 5/02 |
| 9,651,985 | B2 | * | 5/2017 | Shih | G02B 27/022 |
| 9,705,183 | B2 | * | 7/2017 | Nikitin | H01Q 3/24 |
| 9,722,652 | B2 | * | 8/2017 | Sakuma | G06F 3/041 |

(Continued)

*Primary Examiner* — Lewis G West
(74) *Attorney, Agent, or Firm* — Christopher J. Scott

(57) ABSTRACT

A cradle apparatus detects spatial distances from target objects positioned in adjacency to the cradle apparatus, and communicates with a mobile communications device for selectively powering off/on the visual display of the mobile communications device based on its distance from a target object. The cradle apparatus includes a cradle assembly, at least one distance sensor, and sensor support circuitry. The cradle assembly is configured for cradling the communications device and displaying a visual display of the communications device as cradled by the cradle assembly, optionally at an oblique angle relative to a support surface. Each distance sensor is positioned by the cradle assembly for detecting the relative distance of select objects positioned in adjacency to the visual display. The sensor support circuitry communicates each distance sensor to a switch or circuit board for powering off or powering on the visual display depending on its distance from the target object.

20 Claims, 15 Drawing Sheets

(56) References Cited

U.S. PATENT DOCUMENTS

| | | | | |
|---|---|---|---|---|
| 9,838,060 | B2* | 12/2017 | McGaughey | H04M 1/0202 |
| 10,002,592 | B2* | 6/2018 | Cho | G09G 5/373 |
| 10,667,589 | B2* | 6/2020 | Fathollahi | A45C 13/02 |
| 2012/0129580 | A1* | 5/2012 | Tam | G01S 7/4813 |
| | | | | 455/575.1 |
| 2013/0109435 | A1* | 5/2013 | McGaughey | H01Q 1/40 |
| | | | | 455/556.1 |
| 2014/0152890 | A1* | 6/2014 | Rayner | H04N 5/2252 |
| | | | | 348/376 |
| 2014/0168054 | A1* | 6/2014 | Yang | G06F 3/013 |
| | | | | 345/156 |
| 2014/0192481 | A1* | 7/2014 | Wojcik | G06F 21/86 |
| | | | | 361/679.55 |
| 2016/0191097 | A1* | 6/2016 | Huh | H04M 1/0268 |
| | | | | 455/575.1 |
| 2016/0205237 | A1* | 7/2016 | Baek | H04M 1/0245 |
| | | | | 455/575.8 |
| 2016/0259462 | A1* | 9/2016 | Liao | H04M 15/93 |
| 2016/0315652 | A1* | 10/2016 | Tabatabai | H04M 1/72409 |
| 2021/0049391 | A1* | 2/2021 | Zou | G06T 7/50 |
| 2021/0127000 | A1* | 4/2021 | Kim | G06F 1/3215 |

* cited by examiner

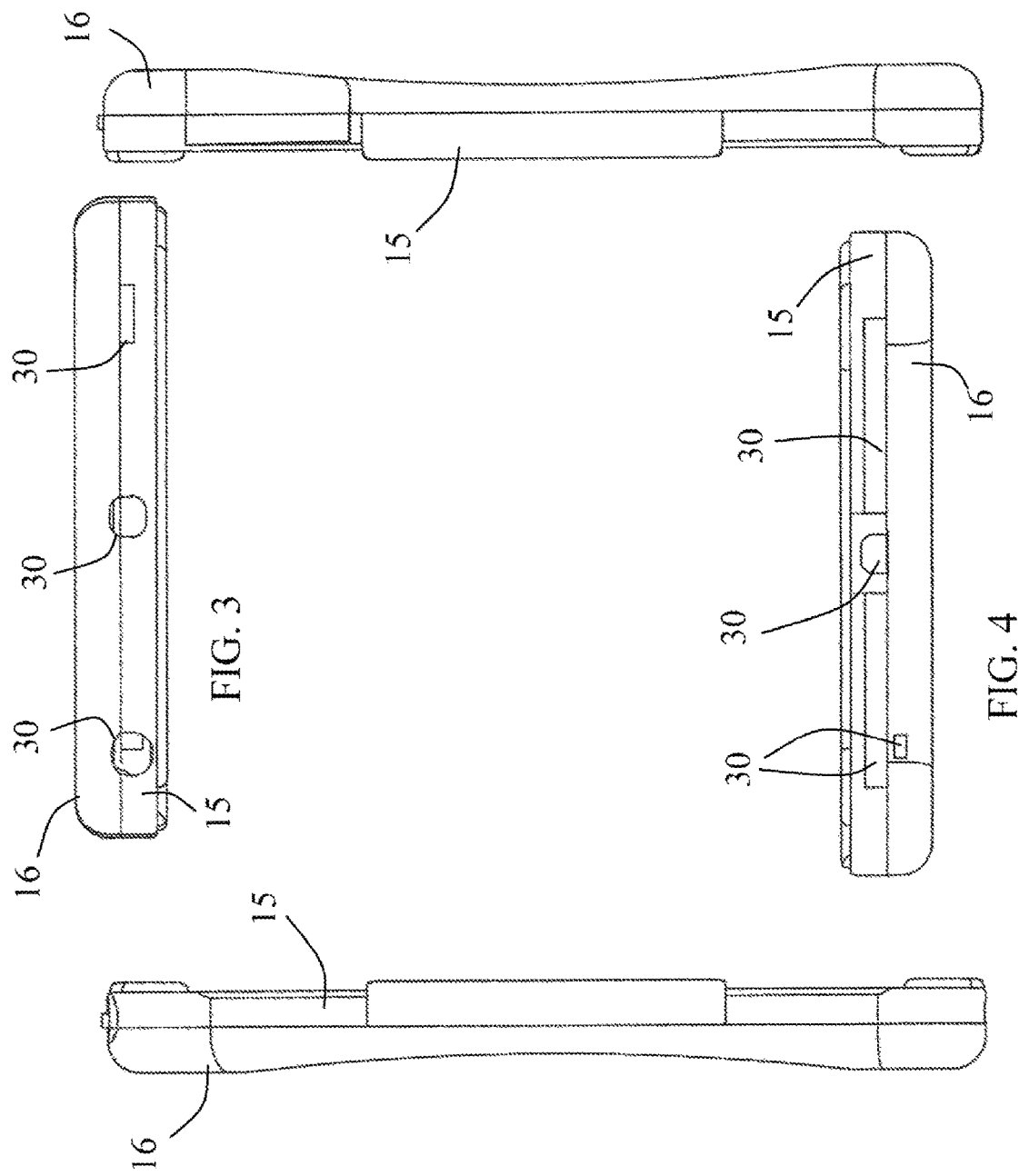

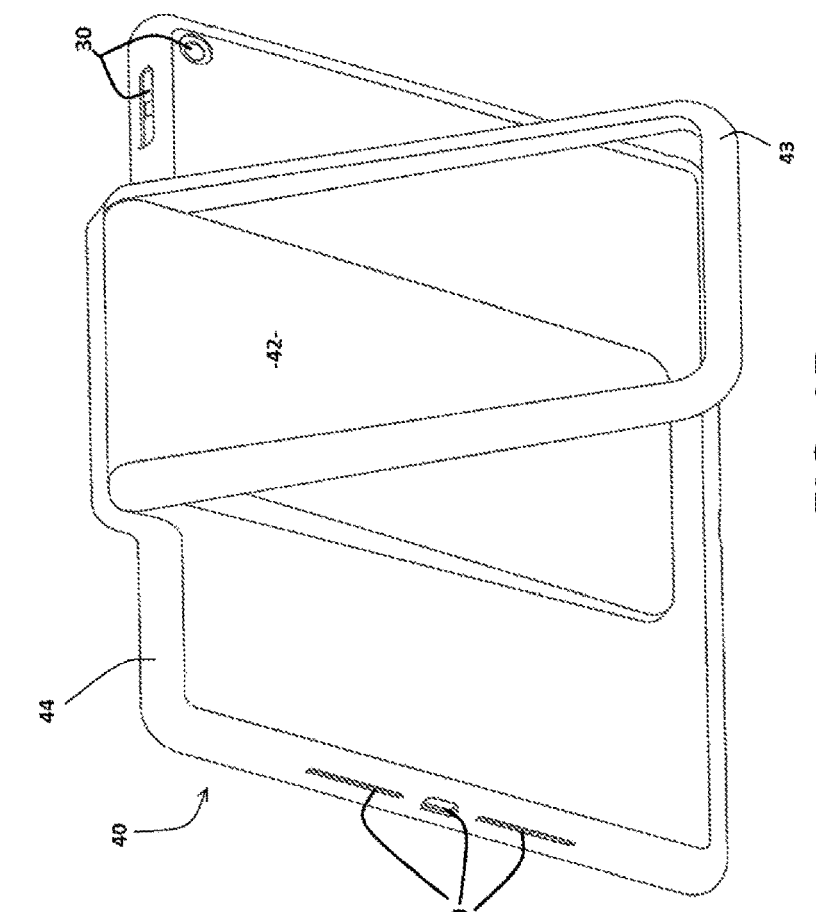
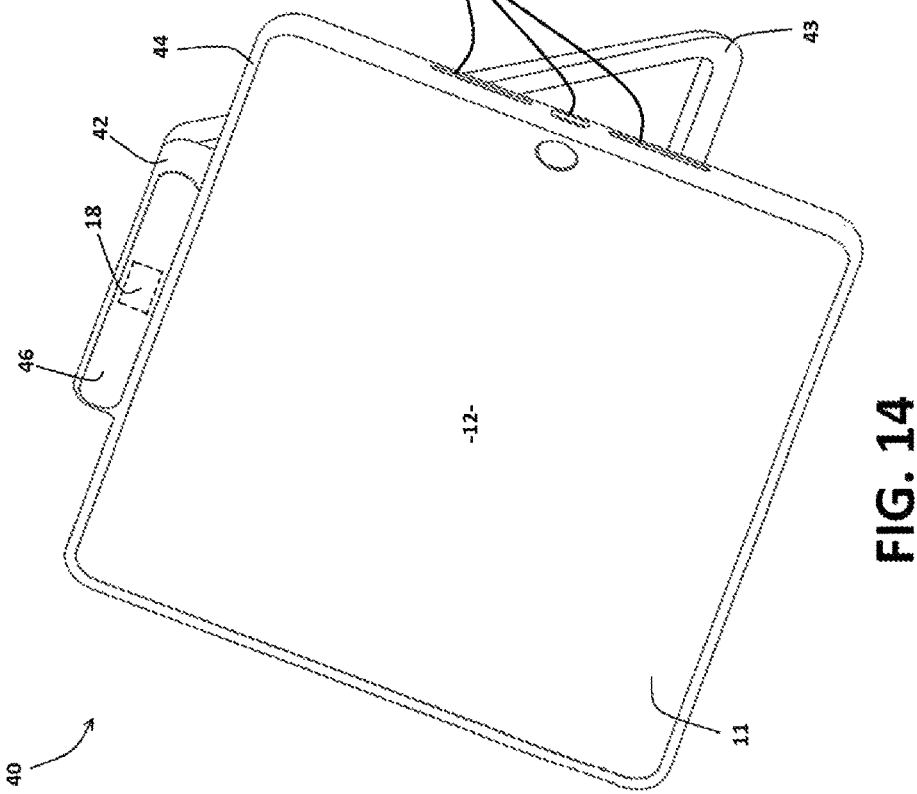

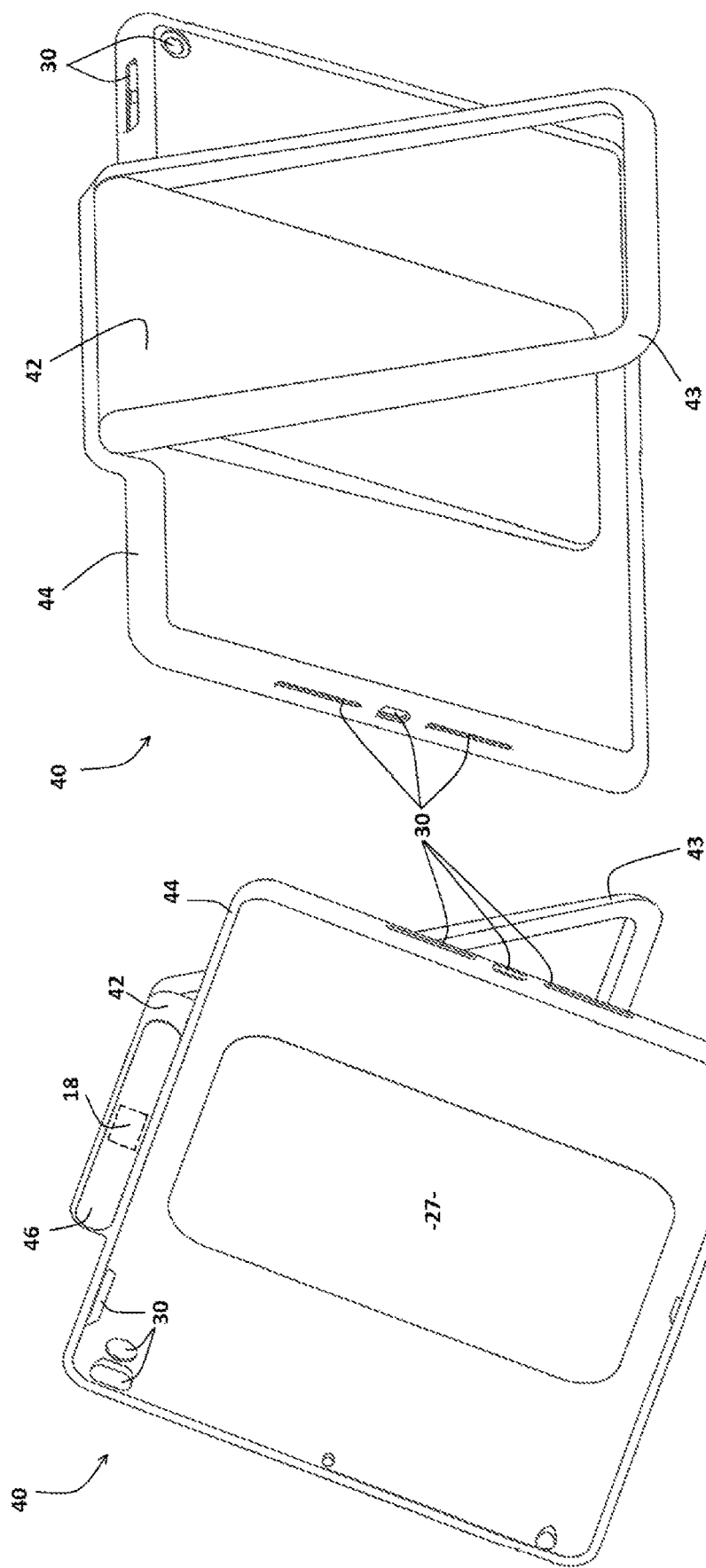

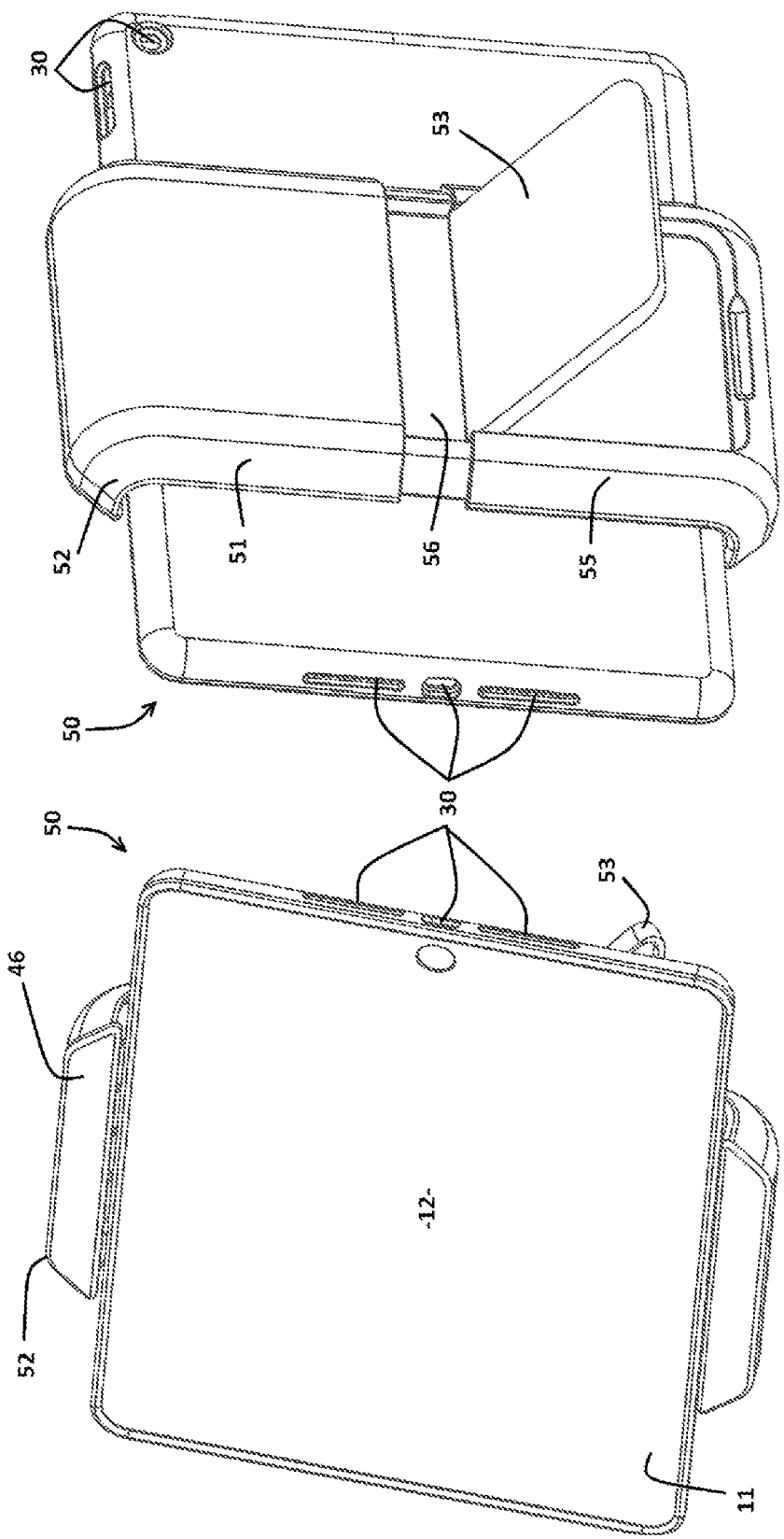

MECHANISM FOR AUTOMATICALLY POWERING OFF/ON A VISUAL DISPLAY

PRIOR HISTORY

This application claims the benefit of U.S. Provisional Patent Application No. 63/110,933 filed in the United States Patent and Trademark Office (USPTO) on 6 Nov. 2020; and is a Continuation-in-Part application of U.S. patent application Ser. No. 16/844,444 filed in the USPTO on 9 Apr. 2020, the specifications and drawings of which applications are hereby incorporated by reference thereto.

BACKGROUND OF THE INVENTION

Field of the Invention

"The present invention relates generally to means for automatically powering off and powering on the visual display of a mobile or electronic communications device when the device is positioned within a certain distance from a user's face. A preferred embodiment of the present invention more particularly relates to a cradle or cover apparatus operable to encase or cover or support a mobile or electronic communications device exemplified by a tablet computer for detecting spatial distancing from a user's face and communicating with the communications device for automatically powering off and powering on the communications device depending on spatial distance from the user's face so as to prevent the visual display of the electronic communications device from harming the user's vision."

SUMMARY OF THE INVENTION

"Among the many objectives of the invention is the provision of a cover or cradle apparatus that operates to cover or cradle or support and protect a mobile communications device exemplified by a tablet type computer so as to primarily shield the communications device from damage. Users of such devices are often children who often use such devices for educational purposes. It is noted that children are prone to place or position the visual displays of such devices at a position that is considered by some to be too close to the user's face or eyes, potentially causing harm to the user's vision."

Thus there is a perceived need in the art for a mechanism to safeguard the user from any damage that might occur to the user's eyes or vision by automatically turning off the visual displays of such communications devices when placed within a certain proximity or critical distance relative to the user's face or eyes, and to automatically turn on the visual displays of such communications devices when displaced or repositioned to a position that is outside a certain proximity or critical distance relative to the user's face or eyes.

In certain embodiments, the basic invention may be said to essentially teach or disclose a cradle or device support apparatus for (a) cradling or supporting a mobile communications device, (b) detecting spatial distances from objects positioned in adjacency to the mobile communications device as cradled or supported by the cradle apparatus, and (c) and communicating with the mobile communications device for selectively powering off or powering on the visual display of the mobile communications device depending on its distance from a target object exemplified by a user's face or eyes.

The cradle apparatus according to the present invention essentially comprises a cradle assembly, at least one distance sensor, and sensor support circuitry for powering off or powering on the cradled device with visual display based on proximity of the at least one distance sensor relative to a target object. The cradle assembly is essentially configured for receiving or cradling the mobile communications device and displaying the visual display of the mobile communications device as cradled. The at least one distance sensor is positioned in cooperative association with the cradle assembly for detecting the relative distance of select or target objects positioned in adjacency to the visual display of the mobile communications device as received or cradled by the cradle assembly.

The sensor support circuitry preferably communicates the at least one distance sensor with a circuit or switch for powering off or powering on circuit components housed by the cradle assembly for further powering off the visual display when the cradle assembly is positioned within a select distance from a select object exemplified by a user's face and powering on the visual display when the cradle assembly is positioned outside the select distance from the select object exemplified by a user's face.

Each distance sensor is preferably positioned so as to be substantially coplanar with an anterior surface of the visual display of the mobile communication device as received or cradled by the cradle assembly for enhancing the accuracy of the object-to-device distance measurement. In this regard, it is contemplated that the preferred select distance is a distance value of 10 to 12 inches, which select distance may be adjusted according to the user's needs or preferences.

The cradle assembly preferably comprises an anterior visual display frame portion and a posterior device support portion. The at least one distance sensor may be preferably and posteriorly positioned adjacent at least one sensor aperture formed in the anterior visual display frame portion for detecting the distance of objects anteriorly located relative to the anterior visual display frame portion via the at least one sensor aperture.

In a preferred embodiment, the cradle apparatus according to the present invention comprises at least two distance sensors for enhancing the accuracy of object-to-device distance measurement. A first distance sensor of the at least two distance sensors is preferably positioned adjacent a first sensor aperture formed in a first visual display frame portion of the anterior visual display frame portion and a second distance sensor of the at least two distance sensors is preferably positioned adjacent a second sensor aperture formed in a second visual display frame portion of the anterior visual display frame portion.

The first visual display frame portion may preferably be defined by a select longitudinal end frame portion and the second visual display frame portion may preferably be defined by a select lateral side frame portion extending orthogonally relative to the select longitudinal end frame portion. The at least two distance sensors are thus preferably positioned at longitudinal and latitudinal positions relative the visual display for further enhancing the accuracy of object-to-device distance measurement.

The cradle apparatus according to the present invention may be said to alternatively and basically operate to cradle a visual display, detect spatial distances from objects positioned in adjacency to a cradled visual display, and selectively power on and off the cradled visual display depending on the spatial distancing between the cradled visual display and the target object. The cradle apparatus may thus be said to essentially comprise a cradle assembly, at least one sensor, and certain sensor support circuitry. The cradle assembly is essentially configured for receiving or cradling and simultaneously displaying the visual display.

Each distance sensor is preferably positioned in cooperative association with the cradle assembly for detecting the relative distance of select objects positioned in adjacency to the cradled visual display. The sensor support circuitry communicates each distance sensor with a circuit or switch for powering off the cradled visual display when the cradle assembly is positioned within a select distance from a select object and powering on the cradled visual display when the cradle assembly is positioned outside the select distance from the select object.

The present invention further contemplates certain means for eliminating the cradle apparatus and outfitting an electronic or mobile communications device directly with sensors for detecting spatial distance from a user's face which sensors may operate directly with the computing circuitry and hardware of the outfitted mobile communications device to automatically power off and power on the outfitted device depending on its spatial distance relative to the user's face for enhancing safe use of the outfitted device.

BRIEF DESCRIPTIONS OF THE DRAWINGS

Other features and objectives of the invention will become more evident from a consideration of the following brief descriptions of patent drawings.

FIG. 2 is a first lateral edge view of the cradle apparatus according to the present invention.

FIG. 3 is a top edge view of the cradle apparatus according to the present invention.

FIG. 4 is a bottom edge view of the cradle apparatus according to the present invention.

FIG. 5 is a second lateral edge view of the cradle apparatus according to the present invention.

FIG. 14 is an anterior perspective view of a first commercial grade cradle apparatus according to the present invention shown cradling a mobile communications device.

FIG. 15 is a first posterior perspective view of the first commercial grade cradle apparatus according to the present invention.

FIG. 16 is an anterior perspective view of a first commercial grade cradle apparatus according to the present invention shown with a mobile communications device removed.

FIG. 17 is a second posterior perspective view of the first commercial grade cradle apparatus according to the present invention.

FIG. 20 is an anterior perspective view of a second commercial grade cradle apparatus according to the present invention shown cradling a mobile communications device.

FIG. 21 is a posterior perspective view of the second commercial grade cradle apparatus according to the present invention.

DETAILED DESCRIPTION OF THE PREFERRED EMBODIMENTS

Figure 1:
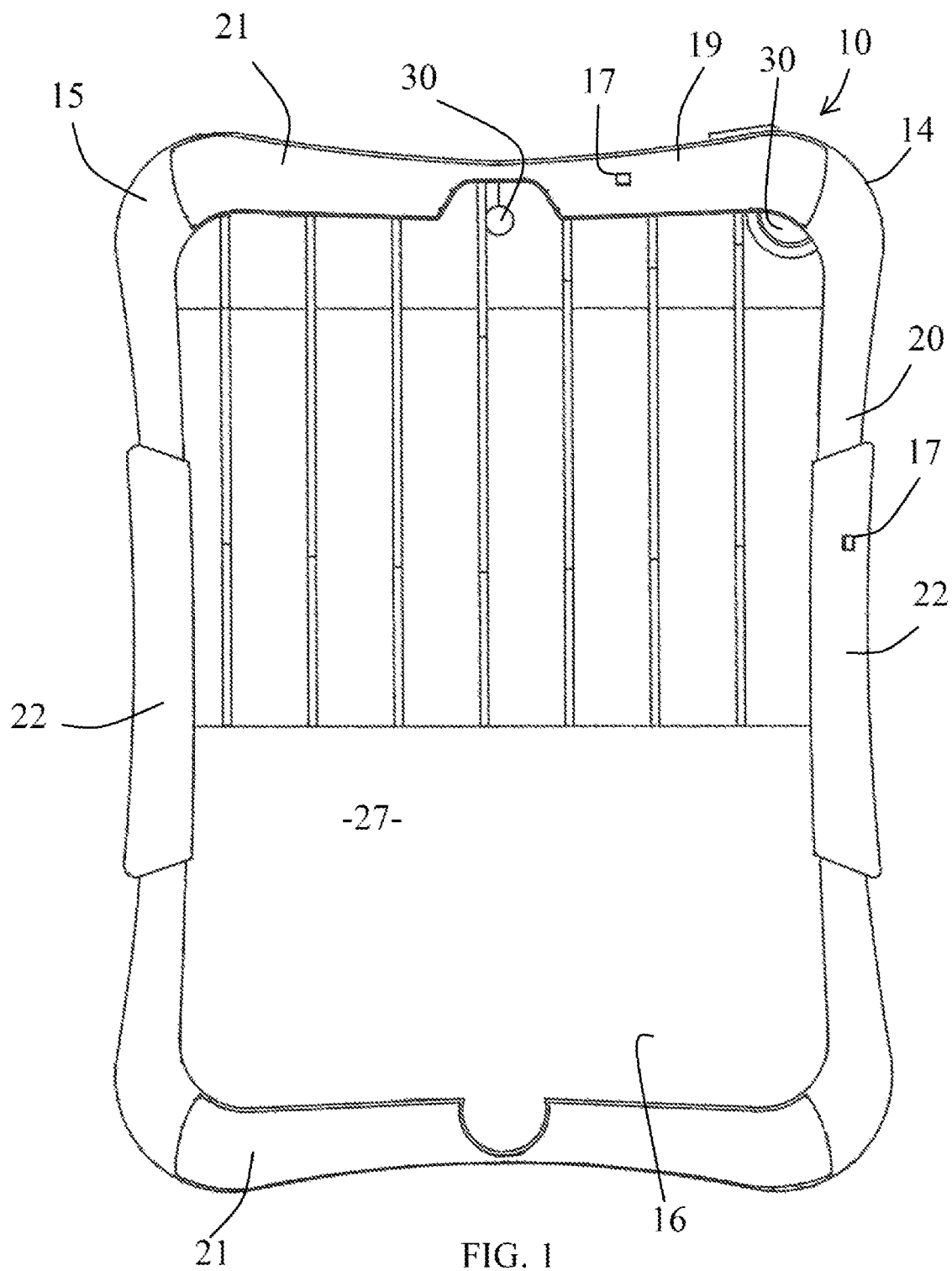
FIG. 1 is an anterior plan view of the cradle apparatus according to the present invention.

Referring now to the drawings with more specificity, the present invention preferably provides various iterations of a cradle or support apparatus as generally depicted and respectively referenced at 10, 40, and 50. The cradle or support apparatuses 10, 40, and 50 according to the present invention basically cradle or support and protect a mobile or electronic communications device as depicted and referenced at 11 when outfitted thereupon.

For purposes of illustrative and descriptive ease, the mobile or electronic communications device 11 usable in combination with the cradle apparatuses 10, 40, and 50 according to the present invention may by typified or exemplified by a tablet computer apparatus having a visual display as at 12. The present invention contemplates further applicability to other similar mobile or electronic communications devices having visual displays, such as smart phones, laptops, and relatively less mobile visual displays such as desktop monitors and the like.

As prefaced above, the cradle apparatuses 10, 40, and 50 according to the present invention further operate to detect spatial distance of the cradle apparatuses 10, 40, and 50 with cradled device 11 or cradled visual display 12 from objects positioned in adjacency to the cradle apparatuses 10, 40, and 50. The spatial distance from the cradle apparatuses 10, 40, and 50 to the target object (e.g. a user's face as at 13) may then be detected and an object-to-device distance measurement operates to power on or power off the visual display 12 of the mobile communications device 11 as cradled or received by the cradle apparatuses 10, 40, and 50.

In this regard, the primary application contemplated by the cradle apparatuses 10, 40, and 50 is to prevent any harmful effects that may otherwise occur when a visual display 12 is placed too close to a user's face 13 or eyes. The object-to-device distance measurement is the basis for powering off or powering on circuit components housed within the cradle apparatuses 10, 40, and 50 for further powering off or powering on the visual display 12 depending on the relative position of the cradle apparatuses 10, 40, and 50 and cradled visual display 12 relative to the user's face 13 as generally and comparatively depicted in FIGS. 6-8.

Figure 6:
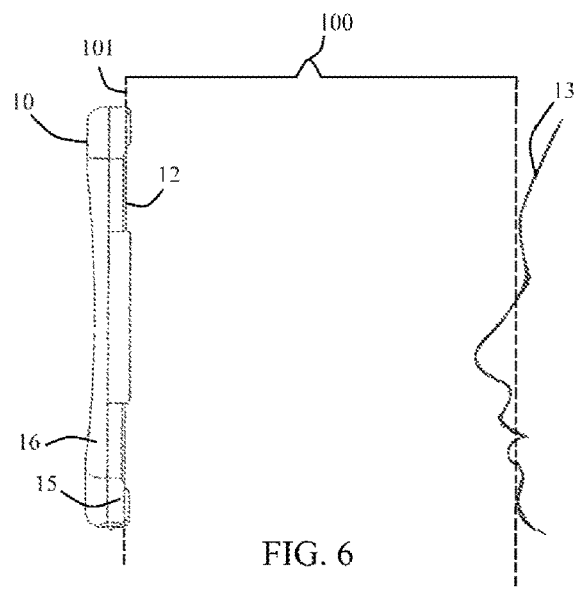
FIG. 6 is a first sequential diagrammatic depiction showing the cradle apparatus according to the present invention positioned a critical distance from a user's face.
Figure 7:
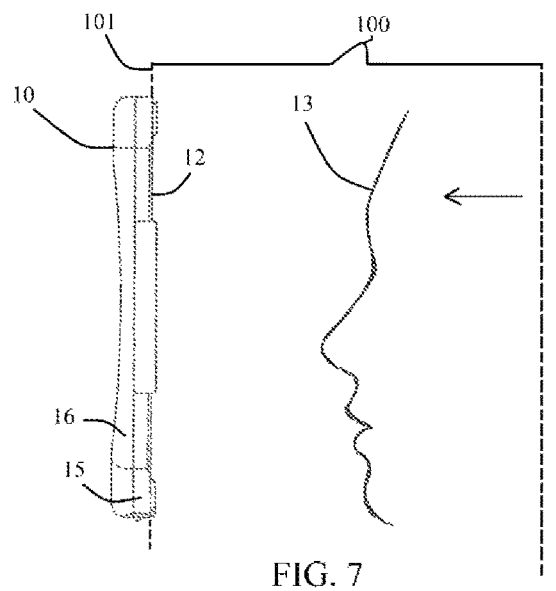
FIG. 7 is a second sequential diagrammatic depiction showing the cradle apparatus according to the present invention positioned within the critical distance from the user's face in which position the visual display of the communications device cradled by the cradle apparatus is in a powered-off state for safeguarding the user's vision.
Figure 8:
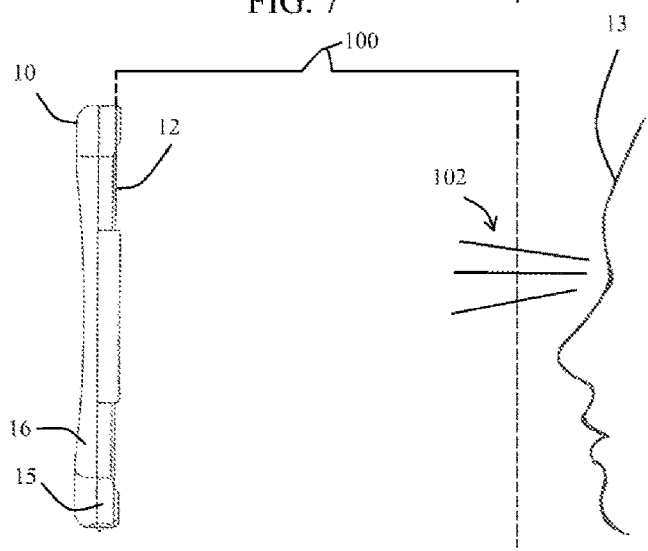
FIG. 8 is a third sequential diagrammatic depiction showing the cradle apparatus according to the present invention positioned outside the critical distance from the user's face in which position the visual display of the communications device cradled by the cradle apparatus is in a powered-on state for enabling the user to view the visual display.

Referencing FIG. 6, the reader will there consider a critical distance 100 from the first preferred embodiment or cradle apparatus 10 relative to the user's face 13. When the user's face 13 is moved or positioned within the critical or select distance 100 relative to plane 101 of the visual display 12 as cradled by the cradle apparatus 10, the visual display 12 of the mobile communications device 11 is powered off for disenabling the user to view content upon the visual display 12 as generally depicted in FIG. 7.

When the user's face 13 is moved outside the critical or select distance 100 relative to the plane 101 of the visual display 12 as cradled by the cradle apparatus 10, the visual display 12 of the mobile communications device 11 is powered on for enabling the user to view content (as at 102) displayed thereupon. While it is contemplated that the preferred critical distance be on the order of 10-12 inches, it is further contemplated that the critical distance 100 may be adjusted according to the needs or preferences of the user.

The cradle apparatus 10 according to the present invention preferably comprises a cradle housing or assembly 14 and sensor support circuitry housed within the cradle housing or assembly 14 for providing the above-noted functionality. The cradle assembly 14 is preferably configured for receiving and cradling the mobile communications device 11 and for readily displaying the visual display 12 of the mobile communications device 11. The cradle assembly 14 preferably comprises an anterior visual display frame portion as at 15 and a posterior device-support portion as at 16.

The anterior visual display frame portion 15 preferably comprises at least one, but preferably two sensor apertures as at 17 for allowing distance sensor(s) 18 positioned in posterior adjacency to the sensor apertures 17 to detect object-to-device distance(s). In other words, at least one distance sensor 18 is preferably posteriorly positioned adjacent at least one sensor aperture 17 formed in the anterior visual display frame portion 15 for detecting distance of objects anteriorly located relative to the anterior visual display frame portion 15 via the sensor aperture(s) or slots 17.

It will be understood from a consideration of the illustrative support material submitted in support of these specifications that the cradle apparatus 10 according to the present invention preferably comprises at least two distance sensors 18 within the operating circuitry. A first distance sensor 18 of the at least two distance sensors 18 is preferably positioned adjacent a first sensor aperture 17 formed in a first visual display frame portion 19 of the anterior visual display frame portion 15 and a second distance sensor 18 of the at least two distance sensors 18 is preferably positioned adjacent a second sensor aperture 17 formed in a second visual display frame portion 20 of the anterior visual display frame portion 15. Highly accurate object-to-device distance measurement data may thereby be collected via triangulation principles in view of the fixed distance between the spaced sensors 18 that are preferably positioned so as to be substantially coplanar with the anterior surface of the visual display 12 as at plane 101.

Referencing FIG. 1, the reader will there consider that the first visual display frame portion 19 may preferably be defined by a select longitudinal end frame portion of the two opposite, upper and lower longitudinal ends 21 of the cradle assembly 14. Further, the second visual display frame portion 20 may preferably be defined by a select lateral side frame portion of the two laterally opposed lateral side frame portions 22. The lateral side frame portions 22 generally extend orthogonally relative to the longitudinal end frame portions 21 such that the at least two distance sensors 18 are preferably positioned at longitudinal and latitudinal positions relative the visual display 12 for enhancing the accuracy of object-to-device distance measurement data obtained from the distance sensors 18 for selectively powering off or powering on the visual display 12 of the mobile communications device 11.

Figure 9:
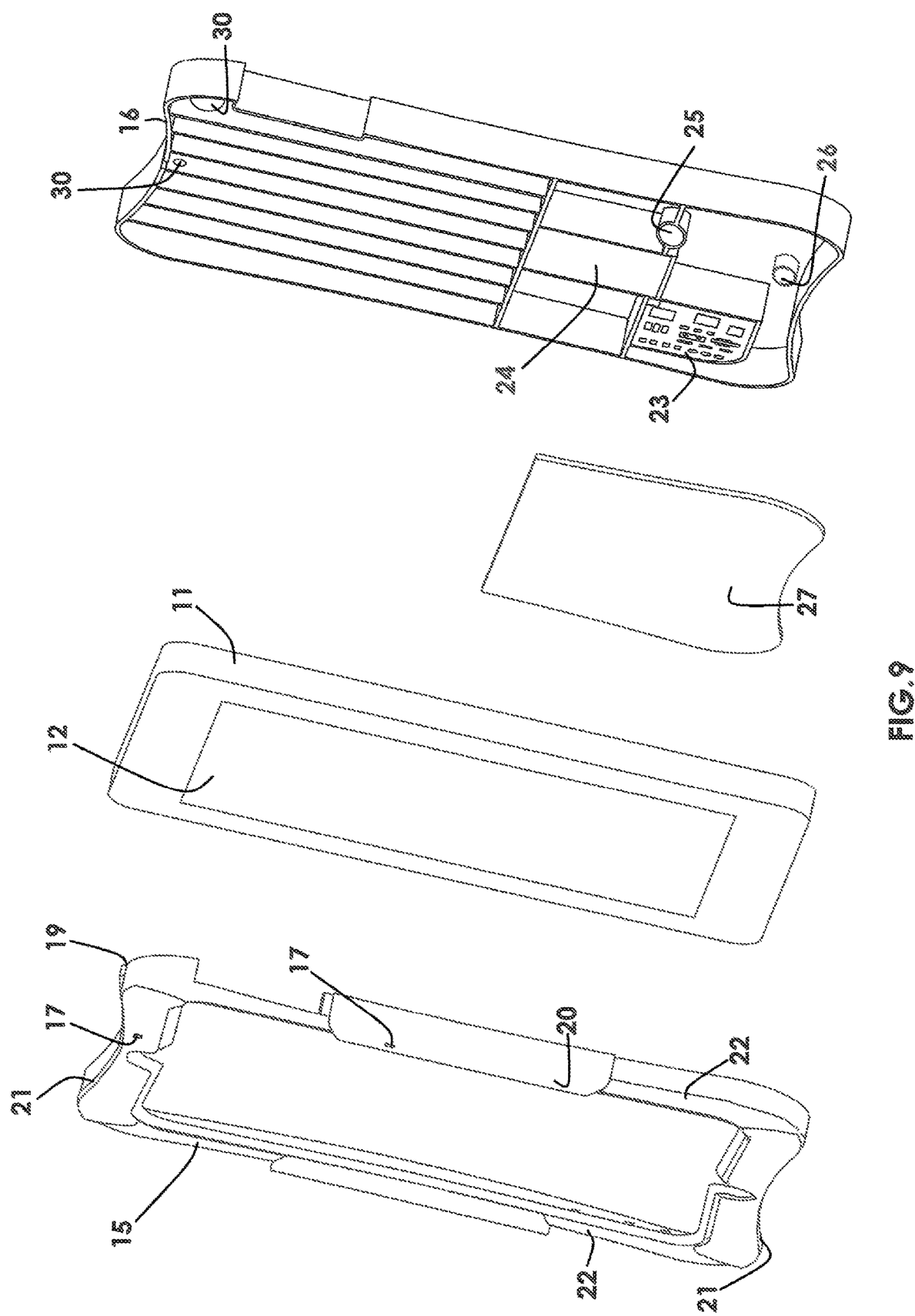
FIG. 9 is an anterior exploded perspective view showing from left to right an anterior visual display frame portion, a communications device, a circuit compartment cover panel, and a posterior device support portion housing circuit components.
Figure 10:
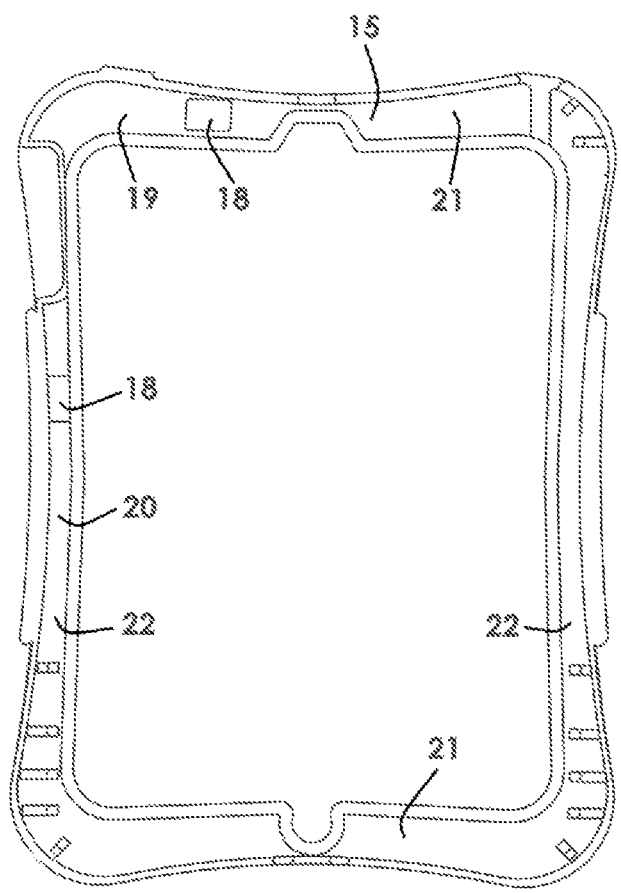
FIG. 10 is a posterior plan view of the anterior visual display frame portion showing two distance sensors mounted thereon.
Figure 10A:
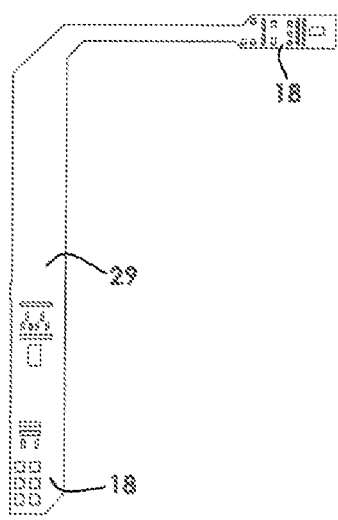
FIG. 10A is a plan view of a sensor strip showing two distance sensors at the opposite ends of the sensor strip.

Referencing FIG. 10, the reader will there consider the two spaced distance sensors 18 respectively positioned at the first visual display frame portion 19 as preferably defined by a select longitudinal end frame portion of the two opposite, upper and lower longitudinal ends 21 and at the second visual display frame portion 20 as preferably defined by a select lateral side frame portion of the two laterally opposed lateral side frame portions 22. Comparatively referencing FIGS. 9 and 10 the reader will further consider the sensor apertures 17 visibly located at the anterior side of the anterior visual display frame portion 15 as depicted in FIG. 9. The distance sensors 18 are positioned in posterior adjacency to these slots or apertures 17 as comparatively depicted in FIG. 10.

Figure 11:
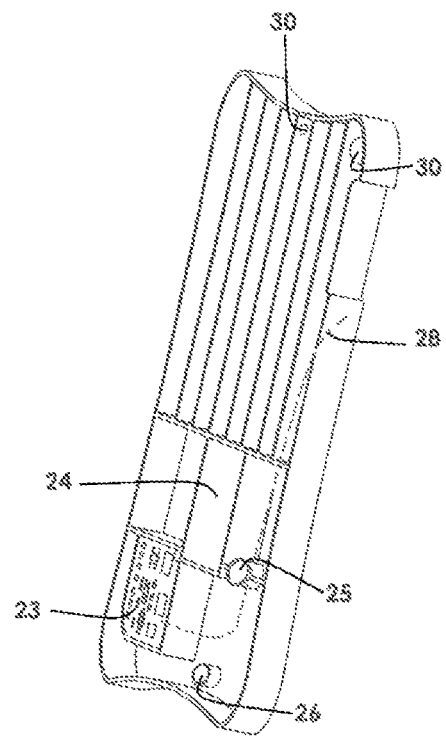
FIG. 11 is an anterior perspective view of the posterior device support portion depicting placement of apparatus circuit components.
Figure 12:
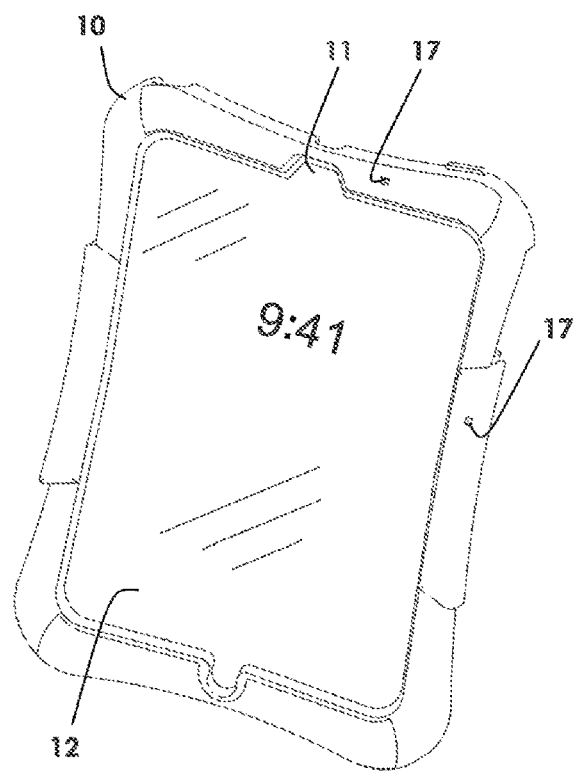
FIG. 12 is an anterior perspective view of the cradle apparatus according to the present invention holding or cradling a mobile communications device with the visual display in a powered-on state.

Further referencing FIG. 9, the reader will there consider circuit components housed within or at the posterior device-support portion 16, including a main circuit board as at 23, a battery as at 24, an electromagnet as at 25, and a permanent magnet as at 26. These components are preferably covered by a circuit compartment cover as at 27. FIG. 11 further depicts a sensor strip communication pathway as at 28 leading from the sensor strip 29 (outfitted with distance sensors 18 located at the ends thereof) to the main circuit board 23. It is contemplated that electromagnetizing the electromagnet 25 provides a simple and effective means to selectively and controllably power off and power on the visual display 12. In this regard, it is contemplated that magnet placement within the cradle assembly 14 may be device-specific for enabling the functionality.

The cradle assembly 14 may further preferably comprise a series of device-cooperative apertures, slots or formations as at 30. In this regard, it is well known in the art that communications devices provide certain peripheral input and output features so that users thereof may more effectively operate the devices. The device-cooperative apertures, slots or formations 30 are formed in the material construction of the cradle assembly 14 for enabling the user to utilize the device features via the cradle assembly 14. The device-cooperative apertures, slots or formations 30 may include charging apertures, speaker apertures, microphone apertures, headphone jack apertures, volume button apertures, power button apertures, and camera apertures.

Figure 13:
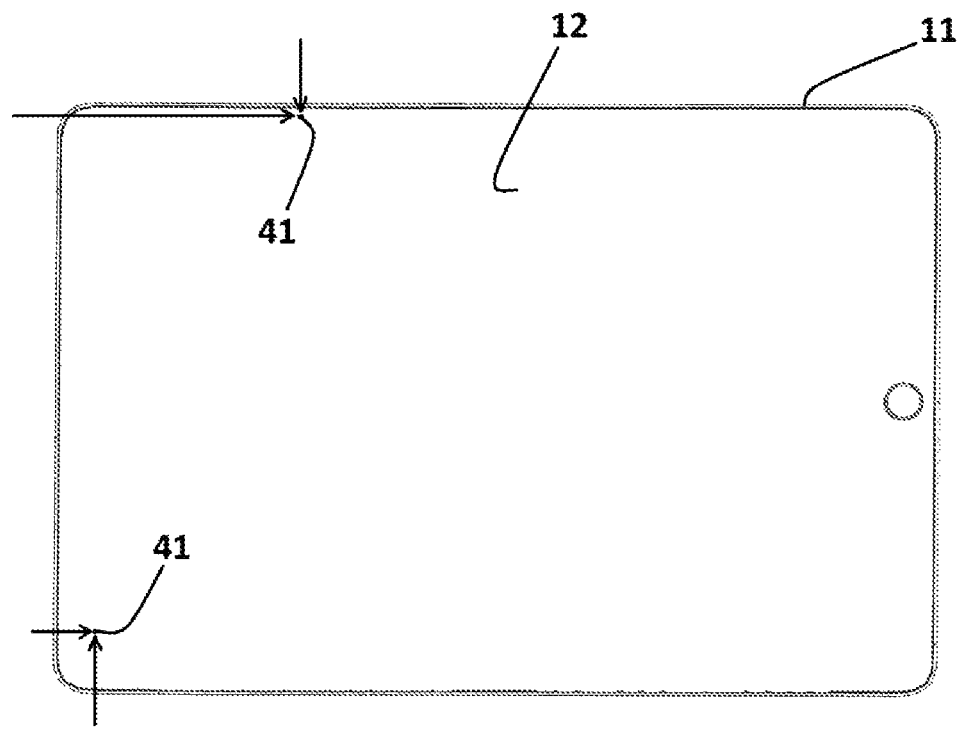
FIG. 13 is an anterior plan view of a state-of-the art tablet computer showing first and second Hall Effect Sensor locations relative to the tablet housing.
Figure 13A:
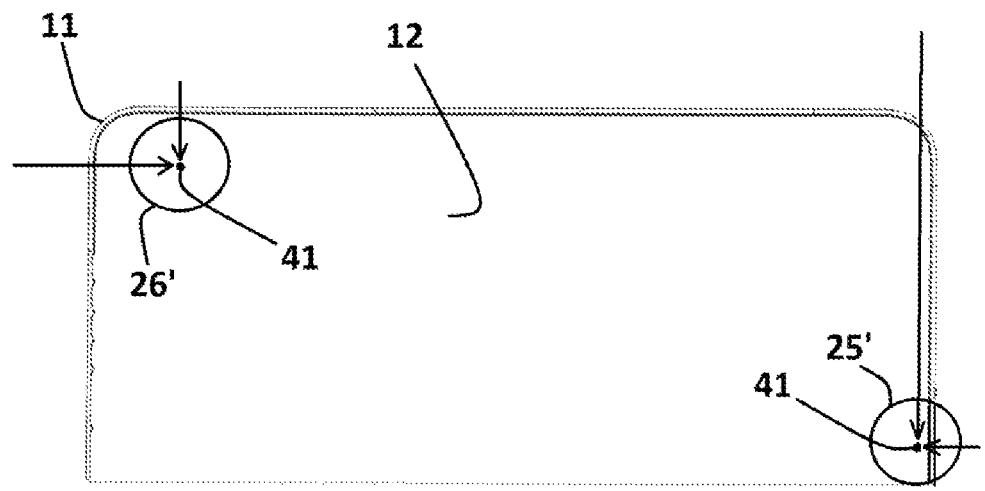
FIG. 13A is a fragmentary enlarged or extended view of the tablet computer otherwise depicted in FIG. 13 further depicting relative placements of a permanent magnet and an electromagnet relative to the first and second Hall Effect sensor locations.
Figure 19:
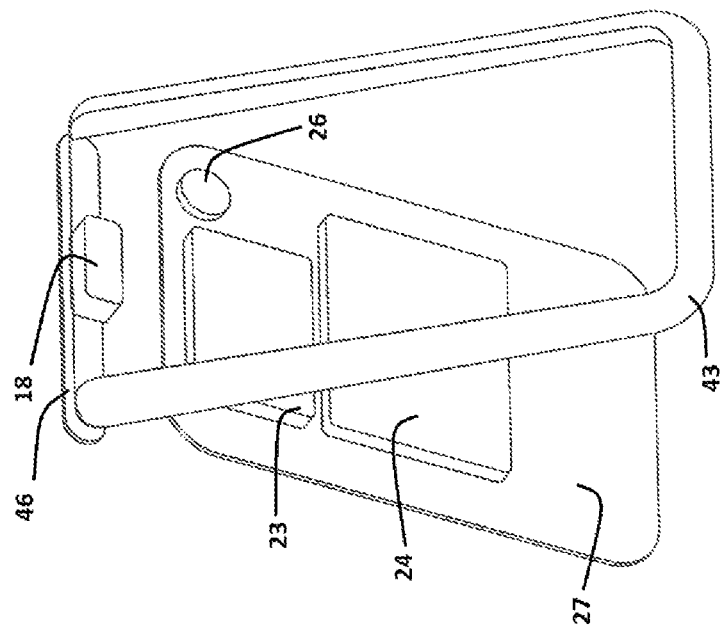
FIG. 19 is a posterior perspective view of the component cover assembly and the stand assembly of the first commercial grade cradle apparatus according to the present invention shown with a cradle portion of the cradle apparatus removed.
Figure 18:
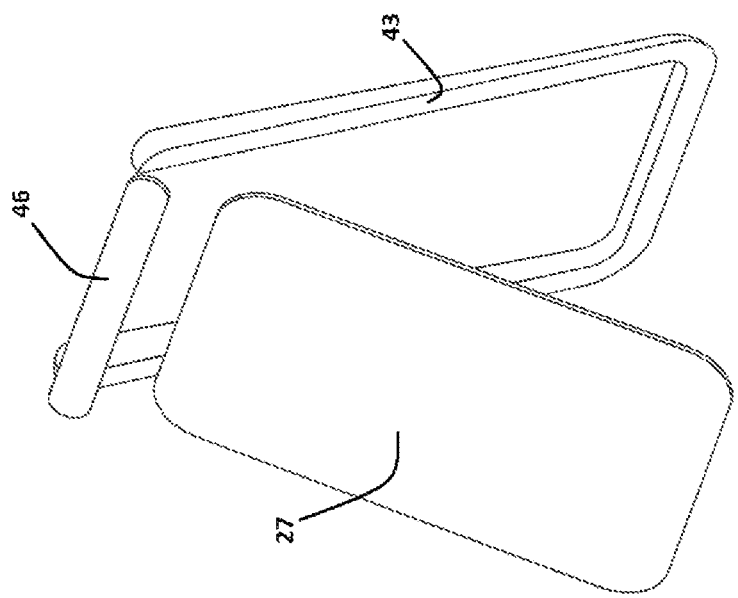
FIG. 18 is an anterior perspective view of a component cover assembly and a stand assembly of the first commercial grade cradle apparatus according to the present invention shown with a cradle portion of the cradle apparatus removed.

Comparatively referencing FIGS. 13 and 13A the reader will there consider a generic mobile communications device 11 with visual display 12. Referencing FIG. 13, the reader will there see the locations 41 of two Hall Effect sensors incorporated into the assemblage of the mobile communications device 11. The various cradle apparatuses 10, 40, and 50 all preferably comprise a permanent magnet 26 and an electromagnet 25, the latter of which may be incorporated into the circuit board assembly 23. Referencing FIG. 13A the reader will there note locations referenced at 26' and 25' which respectively represent the spatially intended locations or placements of the permanent magnet 26 and the electromagnet 25 relative to the mobile communications device 11. It will be recalled that electromagnetizing the electromagnet 25 provides a simple and effective means to selectively and controllably power off and power on the visual display 12. FIGS. 13 and 13A are presented to help the reader understand how magnet placement within the cradle assemblies may be device-specific for enabling the functionality.

The second preferred embodiment or cradle apparatus 40 according to the present invention preferably comprises a cradle housing or assembly 44 and sensor support circuitry housed within a circuit housing portion 42 of the cradle housing or assembly 44 for providing the above-noted functionality. The cradle assembly 44 is preferably configured for receiving and cradling the mobile communications device 11 and for readily displaying the visual display 12 of the mobile communications device 11. The cradle assembly 44 further preferably comprises a cradle support mechanism 43. The cradle support mechanism 43 is akin to a kickstand type feature, and enables the user to display the visual display 12 in a display plane 110, which display plane 110 is preferably obliquely angled (as at angle 112) relative to a support surface as at 111.

An anterior visual display frame portion preferably comprises an apertured sensor cover as at 46 for allowing distance sensor(s) 18 positioned in posterior adjacency to the apertured sensor cover 46 to detect object-to-device distance (s). In other words, at least one distance sensor 18 is preferably posteriorly positioned adjacent the apertured sensor cover 46 formed in the anterior visual display frame portion for detecting distance of objects anteriorly located relative to the anterior visual display frame portion via the apertured sensor cover 46.

Comparatively referencing FIGS. 14-19 versus FIGS. 20-25, the reader will note that cradle apparatus 40 has been illustrated to comprise a single sensor 18 whereas cradle apparatus 50 has been illustrated to comprise laterally opposed sensors 18. As prefaced above, highly accurate object-to-device distance measurement data may thereby be collected via triangulation principles in view of the fixed distance between the spaced sensors 18 that are preferably positioned so as to be substantially coplanar with the anterior surface of the visual display 12.

The cradle assembly 44 may further preferably comprise a series of device-cooperative apertures, slots or formations as at 30. In this regard, it is well known in the art that communications devices provide certain peripheral input and output features so that users thereof may more effectively operate the devices. The device-cooperative apertures, slots or formations 30 are formed in the material construction of the cradle assembly 44 for enabling the user to utilize the device features via the cradle assembly 44. The device-cooperative apertures, slots or formations 30 may include charging apertures, speaker apertures, microphone apertures, headphone jack apertures, volume button apertures, power button apertures, and camera apertures.

The third preferred embodiment or cradle apparatus 50 according to the present invention preferably comprises a cradle housing or assembly 54 and sensor support circuitry housed within a circuit housing portion 52 of the cradle housing or assembly 54 for providing the above-noted functionality. The circuit housing portion 52 is doubly operable to also receive and hold a mobile communications device 11 whether the device 11 is held within a case or cradle or is free of any case or cradle protection. The devices 11 may also be displayed in either a landscape position or a portrait position.

The cradle assembly 54 is preferably configured for receiving and cradling the mobile communications device 11 and for readily displaying the visual display 12 of the mobile communications device 11. The cradle assembly 54 further preferably comprises a cradle support mechanism 53. The cradle support mechanism 53 is also akin to a kickstand type feature, and enables the user to display the visual display 12 in a display plane 110, which display plane 110 is preferably obliquely angled (as at angle 112) relative to a support surface as at 111.

An anterior visual display frame portion preferably comprises an apertured sensor cover as at 46 for allowing distance sensor(s) 18 positioned in posterior adjacency to the apertured sensor cover 46 to detect object-to-device distance (s). In other words, at least one distance sensor 18 is preferably posteriorly positioned adjacent the apertured sensor cover 46 formed in the anterior visual display frame portion for detecting distance of objects anteriorly located relative to the anterior visual display frame portion via the apertured sensor cover 46.

Figure 23:
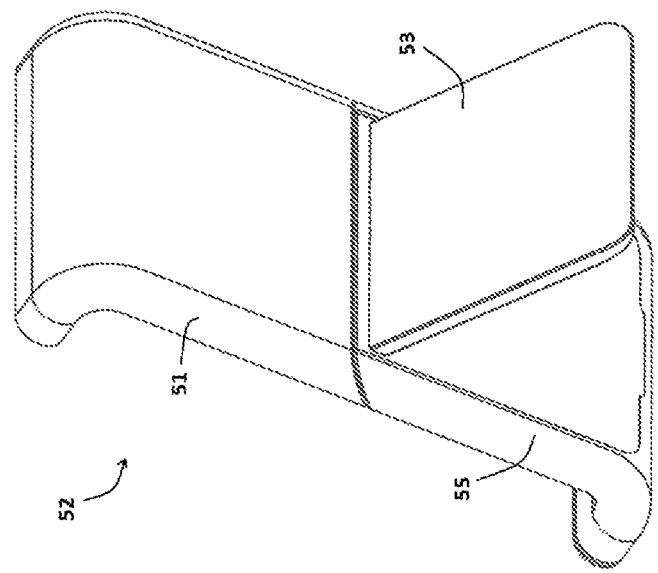
FIG. 23 is a posterior perspective view of the combination component assembly and kickstand assembly of the second commercial grade cradle apparatus according to the present invention showing the combination component assembly and kickstand assembly in the first closed state of use.
Figure 22:
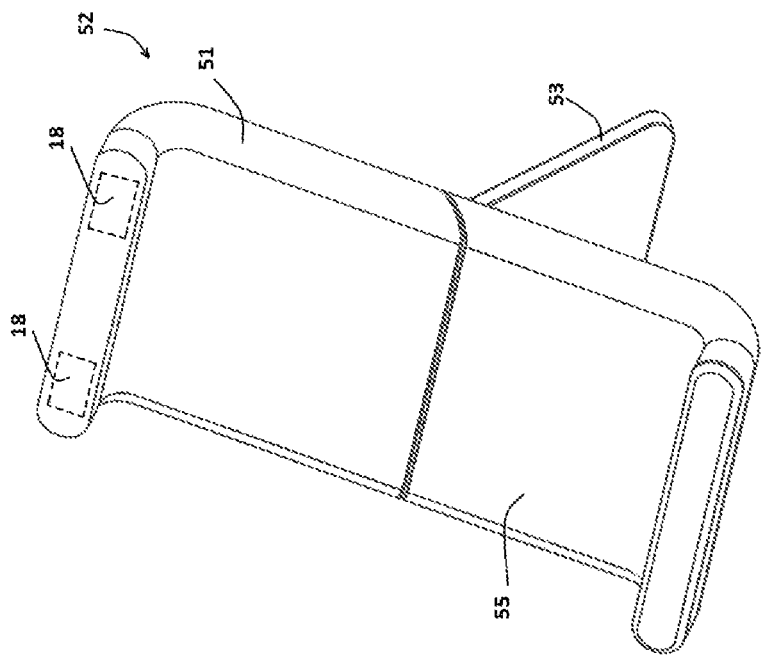
FIG. 22 is an anterior perspective view of a combination component assembly and kickstand assembly of the second commercial grade cradle apparatus according to the present invention showing the combination component assembly and kickstand assembly in a first closed state of use.
Figure 25:
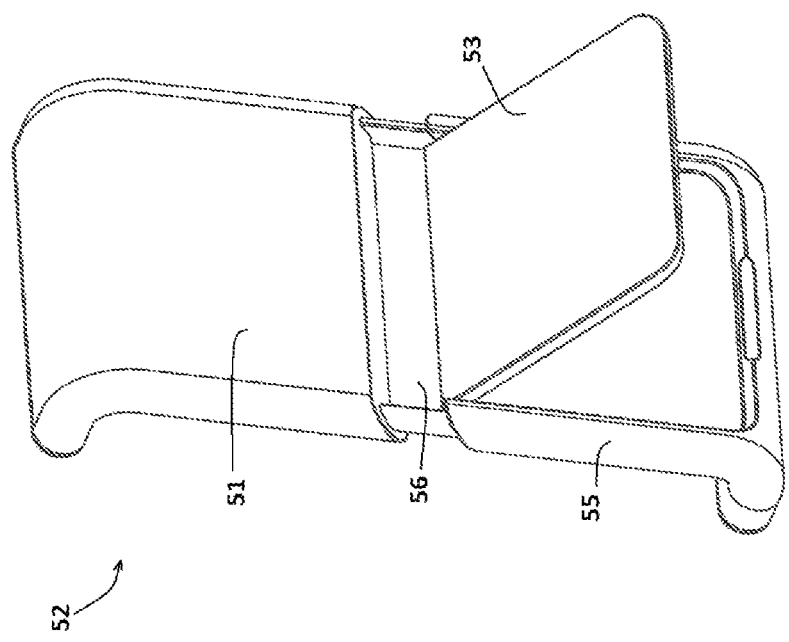
FIG. 25 is a posterior perspective view of the combination component assembly and kickstand assembly of the second commercial grade cradle apparatus according to the present invention showing the combination component assembly and kickstand assembly in a second expanded state of use.
Figure 24:
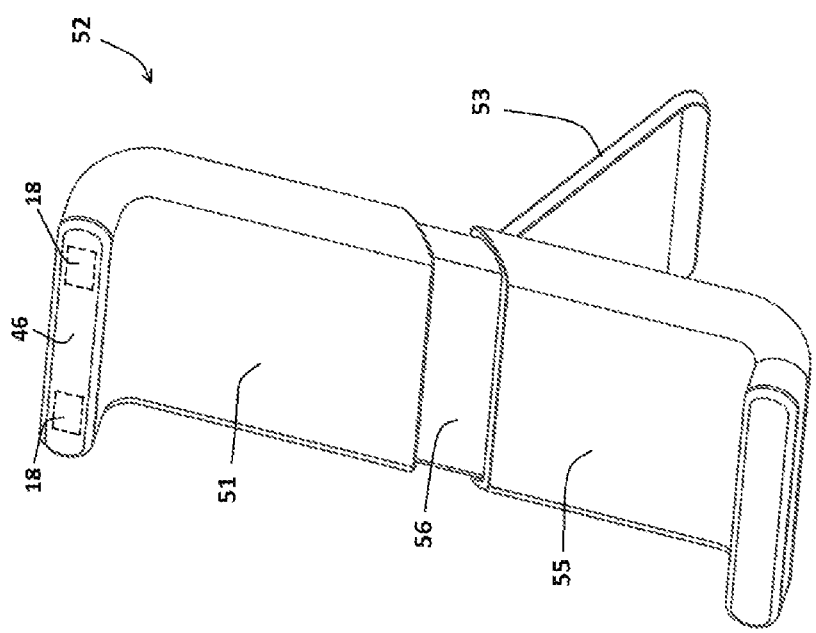
FIG. 24 is an anterior perspective view of the combination component assembly and kickstand assembly of the second commercial grade cradle apparatus according to the present invention showing the combination component assembly and kickstand assembly in a second expanded state of use.
Figure 27:
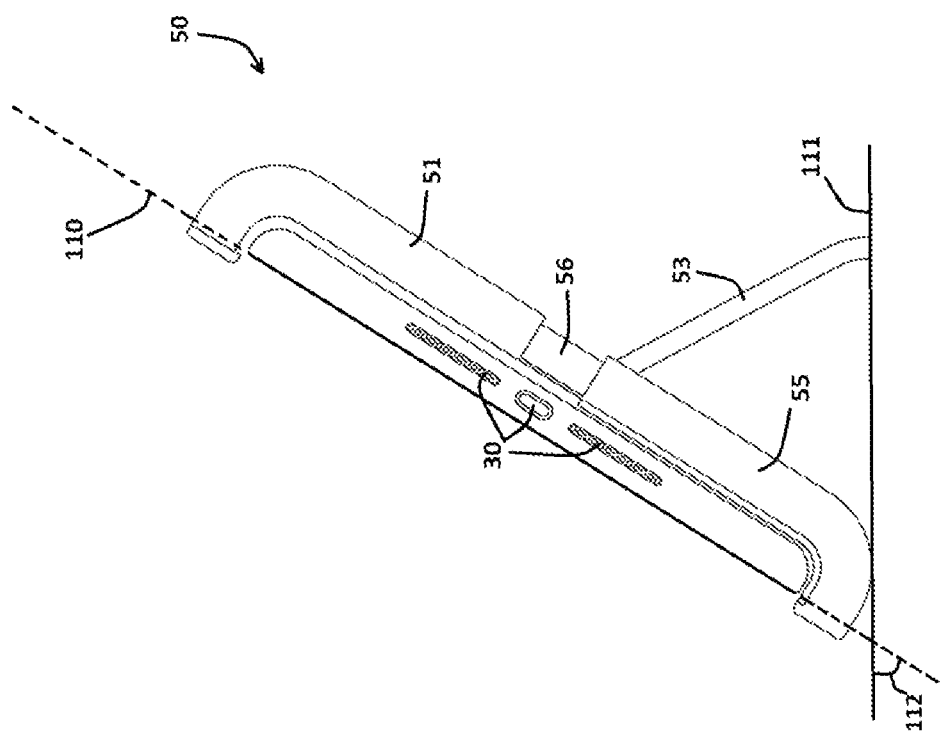
FIG. 27 is a side elevational view of the second commercial grade cradle apparatus according to the present invention shown in a condition of use for angling a mobile communications device relative to the support surface.
Figure 26:
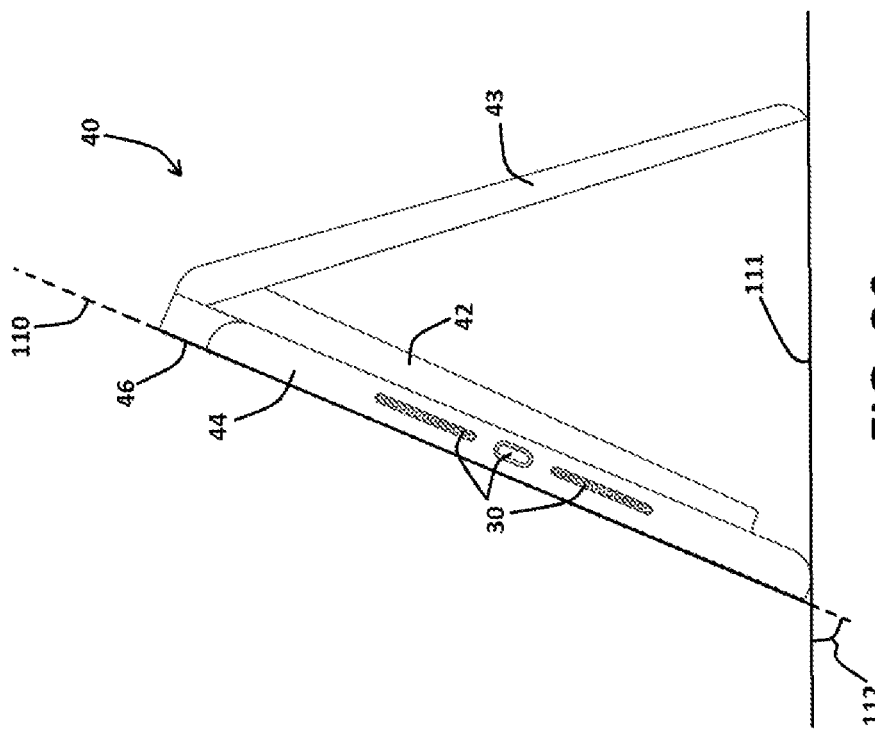
FIG. 26 is a side elevational view of the first commercial grade cradle apparatus according to the present invention shown in a condition of use for angling a mobile communications device relative to the support surface.

The circuit housing portion 52 of the cradle housing or assembly 54 may further preferably comprise a mechanism for adjusting the overall length of the housing portion 52 for accommodating cradles and mobile communications devices 11 having differing widths. FIGS. 24 and 25 depict the circuit housing portion 52 in an extended or expanded state or configuration for structurally cooperating with cradles and mobile communications devices 11 having relatively larger widths whereas FIGS. 22 and 23 depict the circuit housing portion in a reduced or closed configuration to accommodate cradles and mobile communications devices 11 having relatively smaller widths. In this regard, the circuit housing portion 52 comprises an upper housing portion as at 51, a lower housing portion as at 55, and a central housing portion as at 56. The upper housing 51 portion and lower housing portion 55 are telescopically translatable relative to the central housing portion 56. The cradle support mechanism 53 is preferably pivotal attached to the lower housing portion 55.

The cradle assembly 54 may further preferably comprise a series of device-cooperative apertures, slots or formations as at 30. In this regard, it is well known in the art that communications devices provide certain peripheral input and output features so that users thereof may more effectively operate the devices. The device-cooperative apertures, slots or formations 30 are formed in the material construction of the cradle assembly 54 for enabling the user to utilize the device features via the cradle assembly 54. The device-cooperative apertures, slots or formations 30 may include charging apertures, speaker apertures, microphone apertures, headphone jack apertures, volume button apertures, power button apertures, and camera apertures.

The present invention preferably contemplates outfitting a mobile or electronic communications device 11 with automatic means or a mechanism for automatically powering off and powering on the visual display 12 of the mobile or electronic communications device 11. As prefaced above, the mobile communications device mechanism for powering off and powering on the visual display 12 of mobile or electronic communications device 11 according to the present invention operates to detect spatial distance of the mobile or electronic communications device 11 from objects positioned in adjacency to the mobile or electronic communications device 11. The spatial distance from the mobile or electronic communications device 11 to the target object (e.g. a user's face 13) may then be detected and an object-to-device distance measurement operates to power on or power off the visual display 12 of the mobile communications device 11 as outfitted with the automatic means for powering off and powering on the mobile or electronic communications device 11.

In this regard, the primary application contemplated by the mobile communications device mechanism for powering off and powering on the mobile or electronic communications device 11 is to prevent any harmful effects that may otherwise occur when a visual display 12 is placed too close to a user's face 13 or eyes. The object-to-device distance measurement is the basis for powering off or powering on circuit components housed within or directly upon the mobile or electronic communications device 11 for further powering off or powering on the visual display 12 depending on the relative position of the mobile or electronic communications device 11 relative to the user's face 13 as generally and comparatively depicted in FIGS. 28-30.

Figure 28:
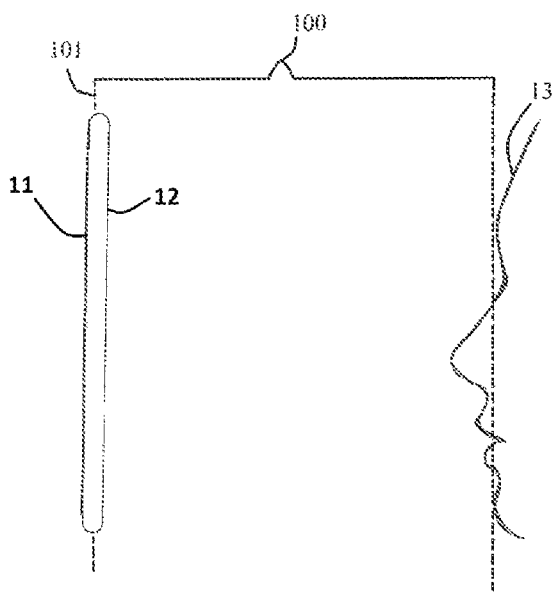
FIG. 28 is a first sequential diagrammatic depiction showing a communications device outfitted with a mechanism for powering off the powering on the communications device positioned at a critical distance form a user's face according to the present invention.
Figure 29:
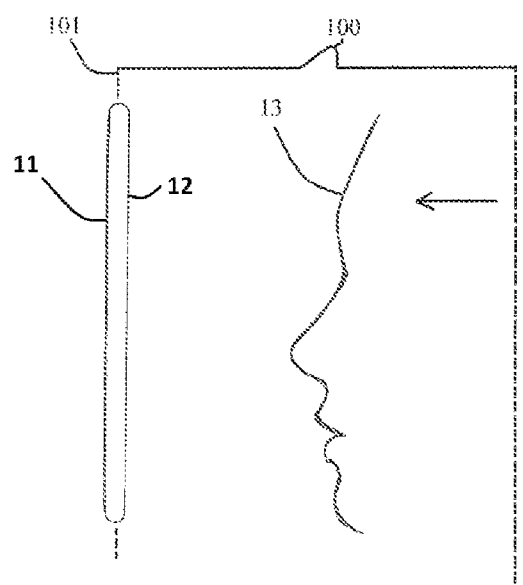
FIG. 29 is a second sequential diagrammatic depiction showing the communications device outfitted with a mechanism for powering off and powering on the communications device positioned within the critical distance from the user's face in which position the visual display of the communications device is in a powered-off state for safeguarding the user's vision.

Referencing FIG. 28, the reader will there consider a critical distance 100 from the mobile or electronic communications device 11 relative to the user's face 13. When the user's face 13 is moved or positioned within the critical or select distance 100 relative to plane 101 of the visual display 12 of the mobile or electronic communications device 11, the visual display 12 of the mobile communications device 11 is powered off for disenabling the user to view content upon the visual display 12 as generally depicted in FIG. 29.

Figure 30:
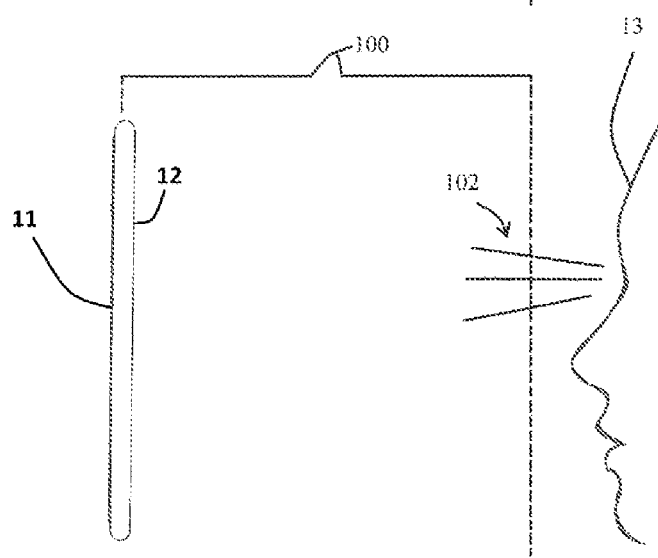
FIG. 30 is a third sequential diagrammatic depiction showing the communications device outfitted with a mechanism for powering off and powering on the communications device positioned outside the critical distance form the user's face in which position the visual display of the communications device is in a powered-on state for enabling the user to view the visual display.

When the user's face 13 is moved outside the critical or select distance 100 relative to the plane 101 of the visual display 12, the visual display 12 of the mobile communications device 11 is powered on for enabling the user to view content (as at 102) displayed thereupon as generally depicted in FIG. 30. While it is contemplated that the preferred critical distance be on the order of 10-12 inches, it is further contemplated that the critical distance 100 may be adjusted according to the needs or preferences of the user.

The mobile communications device mechanism for powering off and powering on the visual display 12 of the mobile or electronic communications device 11 may preferably be exemplified by at least one distance or proximity sensor 18 and sensor support circuitry as described hereinabove. The sensors can be mounted within the device 11, on the device, or coplanar with the visual display or screen 12.

It is contemplated the at least one sensor 18 and sensor support circuitry operate in conjunction with the circuitry and software of the mobile or electronic communications device 11, including its camera feature and central processing unit/chip along with an optional or alternative mobile application operable in conjunction with the camera and/or proximity sensors installed on/in the mobile or electronic communications device 11 to support the functionality herein described.

The sensors and sensor support circuitry may comprise or preferably be exemplified by integrated modules, including an infrared emitter (IRED), proximity sensor (PS), and signal conditioning IC. Filtron technology may be adopted for robust background light cancellation. Lower power consumption: 12C (SMBus compatible) interface. Floor life: 168 H, MSL 3, according to J-STD-020. Output type: 12C bus (ALS/PS). Operation voltage: 2.5 V to 3.6 V.

While the above descriptions contain much specificity, this specificity should not be construed as limitations on the scope of the invention, but rather as an exemplification of the invention. In certain embodiments, the basic invention may be said to essentially teach or disclose a cradle apparatus for (a) cradling a mobile communications device, (b) detecting spatial distances from objects positioned in adjacency to the mobile communications device as cradled by the cradle apparatus, and (c) and communicating with the mobile communications device for selectively powering off or powering on the visual display of the mobile communications device.

The cradle apparatus essentially comprises a cradle assembly, at least one distance sensor, and sensor support circuitry for powering off or powering on the visual display based on proximity of the at least one distance sensor relative to a target object. The cradle assembly is essentially configured for receiving the mobile communications device and displaying the visual display of the mobile communications device. The at least one distance sensor is positioned in cooperative association with the cradle assembly for detecting the relative distance of select or target objects positioned in adjacency to the visual display of the mobile communications device as received or cradled by the cradle assembly.

The sensor support circuitry preferably and essentially communicates the at least one distance sensor with a circuit or switch for powering off or powering on circuit components housed by the cradle assembly for further powering off the visual display when the cradle assembly is positioned within a select distance from a select object exemplified by a user's face and powering on the visual display when the cradle assembly is positioned outside the select distance from the select object exemplified by a user's face.

Each distance sensor is preferably positioned so as to be substantially coplanar with an anterior surface of the visual display of the mobile communication device as received or cradled by the cradle assembly for enhancing the accuracy of the object-to-device distance measurement. In this regard, it is contemplated that the preferred select distance is a distance value of 10 to 12 inches, which select distance may be adjusted according to the user's needs or preferences.

The cradle assembly preferably comprises an anterior visual display frame portion and a posterior device support portion. The at least one distance sensor is preferably posteriorly positioned adjacent at least one sensor aperture formed in the anterior visual display frame portion for detecting the distance of objects anteriorly located relative to the anterior visual display frame portion via the at least one sensor aperture.

In a preferred embodiment, the cradle apparatus according to the present invention comprises at least two distance sensors for enhancing the accuracy of object-to-device distance measurement. A first distance sensor of the at least two distance sensors is preferably positioned adjacent a first sensor aperture formed in a first visual display frame portion of the anterior visual display frame portion and a second distance sensor of the at least two distance sensors is preferably positioned adjacent a second sensor aperture formed in a second visual display frame portion of the anterior visual display frame portion.

The first visual display frame portion may preferably be defined by a select longitudinal end frame portion and the second visual display frame portion may preferably be defined by a select lateral side frame portion extending orthogonally relative to the select longitudinal end frame portion. The at least two distance sensors are thus preferably positioned at longitudinal and latitudinal positions relative the visual display for further enhancing the accuracy of object-to-device distance measurement.

Summarized in a different manner, the cradle apparatus according to the present invention may basically operate to (a) cradle a visual display, (b) detect spatial distances from objects positioned in adjacency to a cradled visual display, and (c) selectively power off and on the cradled visual display depending on its spatial distance from a target or select object. The cradle apparatus may thus be said to essentially comprise a cradle assembly, at least one sensor, and certain sensor support circuitry. The cradle assembly is essentially configured for receiving or cradling and simultaneously displaying the cradled visual display.

Each distance sensor is preferably positioned in cooperative association with the cradle assembly for detecting the relative distance of select objects positioned in adjacency to the cradled visual display. The sensor support circuitry communicates each distance sensor with a circuit or switch for powering off the cradled visual display when the cradle assembly is positioned within a select distance from a select object and powering on the cradled visual display when the cradle assembly is positioned outside the select distance from the select object.

In an alternative embodiment the present invention contemplates a certain mobile communications device mechanism outfittable upon a mobile communications device for (a) detecting spatial distances from objects positioned in adjacency to a visual display of the mobile communications device, and (b) selectively powering off and on the visual display, said means comprising: at least one distance sensor for detecting the relative distance of select objects positioned in adjacency to the mobile communications device; and circuitry for communicating the at least one distance sensor to a circuit for selectively powering off the visual display when the visual display is positioned within a select distance from a select object and powering on the visual display when the visual display is positioned outside the select distance from the select object.

Although the cradle apparatus according to the present invention has been described by reference to a number of different embodiments, aspects, and features, it is not intended that the novel apparatus be limited thereby, but that modifications thereof are intended to be included as falling within the broad scope and spirit of the foregoing disclosure, the appended drawings, and the following claims.

What is claimed is:

1. A cradle apparatus for cradling a mobile communications device, detecting spatial distances from objects positioned in adjacency to the cradle apparatus, and communicating with the mobile communications device, the cradle apparatus comprising:

a cradle assembly, the cradle assembly being configured for cradling and displaying a visual display of the mobile communications device in a display plane, the display plane being oblique to a support surface;

at least one distance sensor, the at least one distance sensor being positioned in cooperative association with the cradle assembly for detecting the relative distance of select objects positioned in adjacency to the visual display of the mobile communications device as cradled by the cradle assembly; and circuitry for communicating the at least one distance sensor with a circuit for powering off or powering on circuit components housed by the cradle assembly for further powering off the visual display when the cradle assembly is positioned within a select distance from a select object and powering on the visual display when the cradle assembly is positioned outside the select distance from the select object.

2. The cradle apparatus of claim 1 wherein the at least one distance sensor is positioned so as to be substantially coplanar with an anterior surface of the visual display of the mobile communication device as cradled by the cradle assembly for enhancing the accuracy of the object-to-device distance measurement.

3. The cradle apparatus of claim 2 wherein the select distance is a distance value of 10 to 12 inches.

4. The cradle apparatus of claim 1 wherein the at least one distance sensor is operable to detect distance from a user's face as spatially positioned relative to the cradle assembly.

5. The cradle apparatus of claim 4 wherein the cradle assembly comprises an anterior visual display frame portion and a posterior device support portion, the at least one distance sensor being posteriorly positioned adjacent at least one sensor aperture formed in the anterior visual display frame portion for detecting the distance of objects anteriorly located relative to the anterior visual display frame portion.

6. The cradle apparatus of claim 5 comprising at least two distance sensors, a first distance sensor of the at least two distance sensors being positioned adjacent a first sensor aperture formed in a first visual display frame portion of the anterior visual display frame portion and a second distance sensor of the at least two distance sensors being positioned adjacent a second sensor aperture formed in a second visual display frame portion of the anterior visual display frame portion, the at least two distance sensors for enhancing the accuracy of object-to-device distance measurement.

7. The cradle apparatus of claim 6 wherein the first visual display frame portion is a select longitudinal end frame portion and the second visual display frame portion is a select lateral side frame portion extending orthogonally relative to the select longitudinal end frame portion, the at least two distance sensors thus being positioned at longitudinal and latitudinal positions relative the visual display for enhancing the accuracy of object-to-device distance measurement.

8. The cradle apparatus of claim 7 wherein the cradle assembly is configured to display the mobile communications device in either a landscape orientation or a portrait orientation.

9. An apparatus for displaying a mobile communications device, the mobile communications device having a visual display, the apparatus for detecting spatial distances from objects positioned in adjacency to the visual display; and selectively powering off and on the visual display, the apparatus comprising:
   a circuit housing for positioning the mobile communications device, the circuit housing housing at least one distance sensor, the at least one distance sensor being positioned by the circuit housing for detecting the relative distance of select objects positioned in adjacency to the visual display; and
   circuitry housed within the circuit housing for communicating the at least one distance sensor to a circuit for selectively powering off the visual display when the visual display is positioned within a select distance from a select object and powering on the visual display when the visual display is positioned outside the select distance from the select object.

10. The apparatus of claim 9 wherein the at least one distance sensor is positioned so as to be substantially coplanar with an anterior surface of the visual display for enhancing the accuracy of the object-to-device distance measurement.

11. The apparatus of claim 10 wherein the select distance is a distance value of 10 to 12 inches.

12. The apparatus of claim 10 wherein the at least one distance sensor is operable to detect distance from a user's face as spatially positioned relative to the visual display.

13. The apparatus of claim 12 wherein the cradle assembly comprises an anterior visual display frame portion and a posterior device support portion, the at least one distance sensor being posteriorly positioned adjacent at least one sensor aperture formed in the anterior visual display frame portion for detecting distance of objects anteriorly located relative to the anterior visual display frame portion.

14. The apparatus of claim 13 comprising at least two distance sensors, a first distance sensor of the at least two distance sensors being positioned adjacent a first sensor aperture formed in a first visual display frame portion of the anterior visual display frame portion and a second distance sensor of the at least two distance sensors being positioned adjacent a second sensor aperture formed in a second visual display frame portion of the anterior visual display frame portion, the at least two distance sensors for enhancing the accuracy of object-to-device distance measurement.

15. The apparatus of claim 14 wherein the circuit housing is configured to display the mobile communications device in either a landscape orientation or a portrait orientation.

16. A mobile communications device support mechanism for (a) detecting spatial distances from objects positioned in adjacency to a visual display of a mobile communications device, and (b) selectively powering off and on the visual display, said mobile communications device support mechanism comprising:
   a device support and at least one distance sensor positioned by the device support for detecting the relative distance of select objects positioned in adjacency to the mobile communications device as supported by the device support; and
   circuitry for communicating the at least one distance sensor to a circuit positioned by the device support for selectively powering off the visual display when the visual display is positioned within a select distance from a select object and powering on the visual display when the visual display is positioned outside the select distance from the select object.

17. The mobile communications device support mechanism of claim 16 wherein the at least one distance sensor is positioned so as to be substantially coplanar with an anterior surface of the visual display for enhancing the accuracy of the object-to-device distance measurement.

18. The mobile communications device support mechanism of claim 16 wherein the at least one distance sensor is operable to detect distance from a user's face as spatially positioned relative to the visual display.

19. The mobile communications device support mechanism of claim 18 wherein the at least one distance sensor is operable to detect distance from a user's face as spatially positioned in anterior adjacency relative to the visual display.

20. The mobile communications device support mechanism of claim 19 wherein the distance is a distance value of 10 to 12 inches.

* * * * *